(12) United States Patent
Fleet

(10) Patent No.: US 7,676,339 B2
(45) Date of Patent: Mar. 9, 2010

(54) APPARATUS AND METHOD OF COMPENSATING A SEAT OFFSET FOR A LOAD APPLIED TO THE SEAT

(75) Inventor: Chad Van Fleet, Salem, MI (US)

(73) Assignee: Robert Bosch GmbH (DE)

( * ) Notice: Subject to any disclaimer, the term of this patent is extended or adjusted under 35 U.S.C. 154(b) by 478 days.

(21) Appl. No.: 11/237,235

(22) Filed: Sep. 28, 2005

(65) Prior Publication Data

US 2006/0091658 A1  May 4, 2006

Related U.S. Application Data

(60) Provisional application No. 60/617,692, filed on Oct. 12, 2004.

(51) Int. Cl.
G01G 23/01 (2006.01)
B60K 28/00 (2006.01)

(52) U.S. Cl. ............................ 702/101; 180/273
(58) Field of Classification Search .............. 702/101, 702/85, 87, 98, 102, 105, 127, 129, 138, 702/139, 173, 174, 179, 182–184, 189, 193–195; 280/734, 751, 730.1, 728.1, 735, 748, 802; 340/457.1, 501, 514, 665–667; 701/45; 177/144, 177/202, 203; 73/862.045, 1.13, 862.041; 180/268, 271, 273, 289

See application file for complete search history.

(56) References Cited

U.S. PATENT DOCUMENTS

| | | | |
|---|---|---|---|
| 4,706,194 A * | 11/1987 | Webb et al. .................. 701/49 |
| 5,282,134 A | 1/1994 | Gioutsos et al. | |
| 5,339,242 A | 8/1994 | Reid et al. | |
| 5,483,449 A | 1/1996 | Caruso et al. | |
| 5,583,771 A | 12/1996 | Lynch et al. | |
| 5,667,244 A | 9/1997 | Ito et al. | |
| 5,790,404 A | 8/1998 | Faye et al. | |
| 6,061,616 A | 5/2000 | Ohno et al. | |
| 6,138,067 A * | 10/2000 | Cobb et al. .................. 701/45 |
| 6,223,606 B1 * | 5/2001 | Burke et al. ........... 73/862.041 |
| 6,407,347 B1 * | 6/2002 | Blakesley .................. 177/144 |
| 6,445,988 B1 * | 9/2002 | Breed et al. .................. 701/45 |
| 6,479,766 B2 * | 11/2002 | Gray et al. .................. 177/144 |
| 6,546,517 B1 * | 4/2003 | Yoshimura .................. 714/763 |
| 6,557,424 B1 * | 5/2003 | Morell .................. 73/862.045 |
| 6,571,647 B1 * | 6/2003 | Aoki et al. ............. 73/862.381 |
| 6,607,212 B1 | 8/2003 | Reimer et al. | |
| 6,609,054 B2 * | 8/2003 | Wallace .................. 701/45 |
| 6,643,575 B2 * | 11/2003 | Ishida et al. .................. 701/45 |
| 6,661,341 B2 * | 12/2003 | Masuda et al. ............. 340/562 |
| 6,678,600 B2 * | 1/2004 | Basir et al. .................. 701/45 |
| 6,759,604 B2 * | 7/2004 | Ishida et al. .................. 177/144 |
| 6,774,319 B2 * | 8/2004 | Aoki et al. .................. 177/144 |
| 6,845,339 B2 * | 1/2005 | Winkler et al. ............. 702/173 |
| 6,940,026 B2 * | 9/2005 | Rundell et al. ............. 177/144 |
| 6,985,077 B2 * | 1/2006 | Nathan et al. ............. 340/457.1 |
| 7,024,295 B2 * | 4/2006 | Oestreicher et al. ........... 701/45 |
| 7,043,997 B2 * | 5/2006 | Mattson et al. .............. 73/800 |

(Continued)

*Primary Examiner*—Edward R Cosimano
*Assistant Examiner*—Toan M Le
(74) *Attorney, Agent, or Firm*—Michael Best & Friedrich LLP

(57) ABSTRACT

A method of compensating a measurement. The method includes determining a zero-point, determining a rate of change of the zero-point, and compensating the measurement based on the rate of change of the zero-point and/or the zero-point. In one embodiment, the compensated measurement is used to control a safety device in a vehicle.

34 Claims, 5 Drawing Sheets

U.S. PATENT DOCUMENTS

| | | | |
|---|---|---|---|
| 7,082,360 B2 * | 7/2006 | Oestreicher et al. | 701/45 |
| 7,239,950 B2 * | 7/2007 | Wanami et al. | 701/45 |
| 7,385,520 B2 * | 6/2008 | Patterson et al. | 340/667 |
| 2004/0215381 A1 * | 10/2004 | Jitsui et al. | 701/45 |

* cited by examiner

APPARATUS AND METHOD OF COMPENSATING A SEAT OFFSET FOR A LOAD APPLIED TO THE SEAT

RELATED APPLICATIONS

This application claims the benefit of U.S. Provisional Application Ser. No. 60/617,692 filed on Oct. 12, 2004, the entire content of which is incorporated by reference herein.

BACKGROUND

Embodiments of the invention relate to an apparatus and a method of compensating a seat offset for a load applied to the seat.

Automobiles are equipped with seat belts and airbags to restrain passengers. In recent years, there is a trend for controlling the operation of such safety devices according to the body weight of a passenger. For example, the amount of gas to be introduced into the airbag, an airbag inflating speed, or a pre-tensioning of the seat belt may be adjusted according to the weight of a passenger. Thus, to perform such adjustments the weight of the seat's occupant needs to be measured.

Several devices have been designed to measure the weight of an occupant while seated. Most of these devices use some form of sensor to measure forces transmitted to the seat. However, many of these devices do not provide an accurate measure of the occupant's weight because the sensor also measures additional forces other than the occupant's weight. Examples of these error-inducing loads include horizontal forces caused by assembly forces or an occupant in the rear of the vehicle pushing on the seatback, twisting moments caused by a leaning occupant, non-vertical load components caused by acceleration and deceleration of the vehicle, and the like. These error-inducing loads (or forces) can be transferred to the sensor and cause the sensor to generate incorrect information.

Thermal issues can also degrade the sensor. During seat installation, the seat is secured to the vehicle by forcing and twisting some metal parts of the seat into position. Once twisted and forced into position, the metal parts will generate forces generally referred to as preload. If the metal parts of the seat are heated by, for example, the sun, the heat accumulated in the seat and its metal parts relaxes the mechanical parts and changes the preload. In this way, the preload can also affect information from the sensor. Furthermore, information from the sensor can become inaccurate over time due to aging and wear of the sensor.

SUMMARY

Even though a seat is empty, aging, wear or other causes may result in a weight sensor generating a non-zero output. If accurate weight sensing is desired, there is a need to correct for such erroneous outputs.

In one form, the invention provides a method of compensating a measurement. The method includes determining a zero-point, determining a rate of change of the zero-point, and compensating the measurement based on the rate of change of the zero-point.

In another form, the invention provides a method of compensating a measurement with a sensing system. The method includes determining a zero-point of the sensing system, determining a rate of change of the zero-point based on the measurement, and compensating the measurement based on the rate of change of the zero-point and the zero-point.

In yet another form, the invention provides a method of compensating for a load applied to a seat. The method includes retrieving a zero-point of the seat, determining a rate of zero-point changes based on the load, updating the zero-point based on the rate of zero-point changes, and updating the load based on the updated zero-point.

In yet another form, the invention provides a method of compensating for a load applied to a seat. The method includes retrieving a zero-point of the seat, and sensing a weight of the load. The method also includes determining a rate of zero-point change based on the weight of the load, and updating the zero-point of the seat based on the zero-point and the rate of the zero-point change.

In still another form, the invention provides an apparatus for compensating for a load applied to a seat. The apparatus includes a computer-readable medium that stores a zero-point of the seat. The apparatus also includes a processor that determines a rate of zero-point changes based on the load, that updates the zero-point based on the rate of zero-point changes, and that compensates the load based on the updated zero-point.

In still another form, the invention provides a system for compensating for a load applied to a seat. The system includes a computer-readable medium to store a zero-point of the seat, and a sensor to sense a weight of the load. The system also includes a processor that determines a zero-point change based on the weight of the load, and a compensating module that compensates for the weight of the load based on the zero-point and the zero-point change.

In yet another form, the invention provides a method of controlling a restraint device in a vehicle having a seat. The method includes sensing a weight applied to the seat of the vehicle, and determining from the weight a zero-point. The method also includes compensating for the weight with the zero-point, and activating the restraint device after the weight has been compensated.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention provide a method of establishing a measurement. In one embodiment, the method comprises determining a zero-point, determining a rate of change of the zero-point, and compensating the measurement based on the rate of change of the zero-point.

Figure 1:
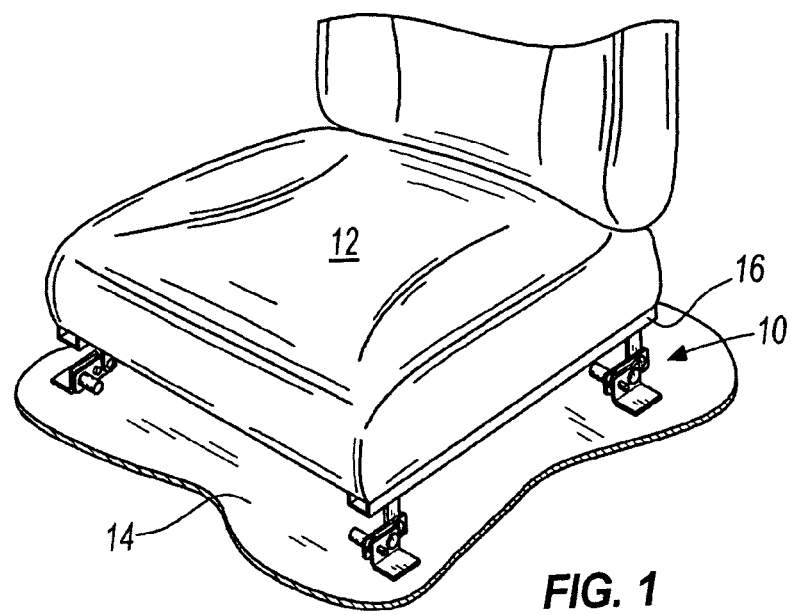
FIG. 1 is a perspective view of an exemplary seat coupled to the floor of a vehicle.

FIG. 1 illustrates a plurality of brackets 10 positioned below a seat 12 to support and connect the seat 12 to a floor 14 of a vehicle (not shown). For example, in some constructions, one bracket 10 can be placed under each corner of the seat 12 as illustrated. However, in other constructions, other number of brackets can be used. Additionally, the bracket(s) 10 can be connected directly to the seat 12 or indirectly connected to the seat 12 through structures such as rails 16. Finally, although the illustrated brackets 10 are all oriented in the same direction, in some constructions, the brackets 10 can be oriented different from one another. For example, the front and rear brackets 10 can be mirror images of each other.

Figure 2:
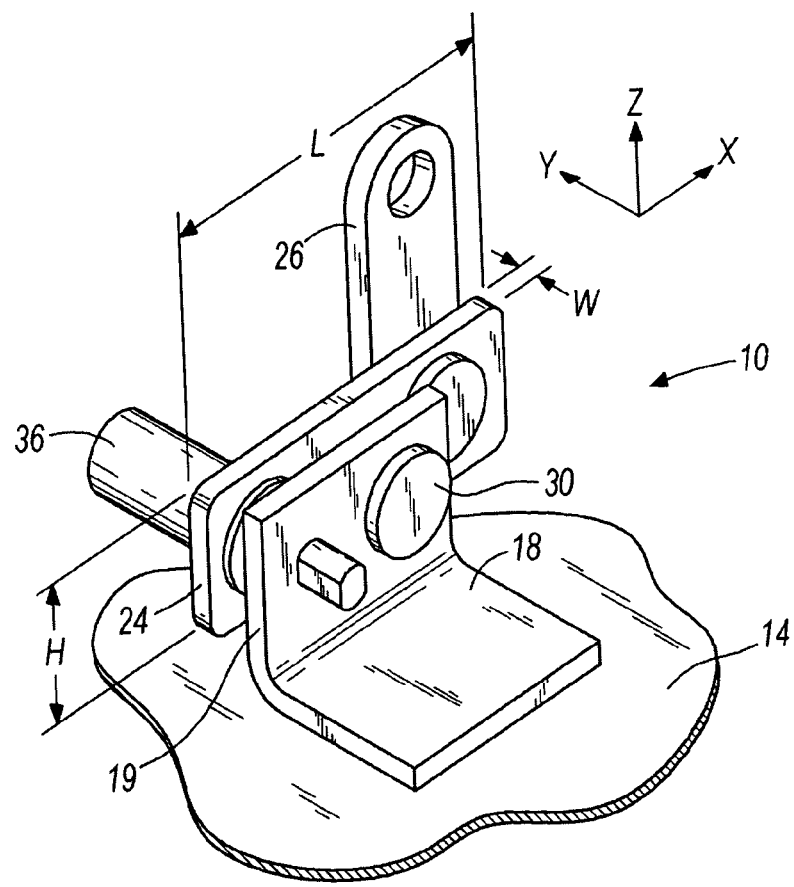
FIG. 2 is a perspective view of an exemplary bracket of the seat of FIG. 1.

One specific construction of the bracket 10 is illustrated in FIG. 2. As illustrated, the bracket 10 has a support or base 18 that couples the bracket 10 to the floor 14 of the vehicle, a lever 24 coupled to the support 18 via a pivot 30, and a weight sensor 36 coupled to both the lever 24 and the support 18. As will be discussed in greater detail below, the weight sensor 36 is able to detect a value of a phenomena, or a phenomena representative of the weight of the occupant based upon the forces placed on the weight sensor 36. The support 18 also has a flange 19 that extends up from the floor to support the lever 24 above the floor 14. The seat 12 can be coupled to the rail 16 in a conventional manner and the rail 16 can be coupled to the lever 24 directly or via other structures such as a linkage 26. While FIG. 2 shows that the weight sensor 36 is coupled to the lever 24 and the support 18, the weight sensor 36 can also be coupled to or secured in other places in other fashions.

Once installed, the weight sensors 36 can be used to sense a phenomena or a value of a phenomena experienced in the vehicle, such as the weight of an occupant seated in the vehicle. To accurately measure the weight of the occupant, the information detected by the weight sensors 36 is adjusted or updated by compensating for an offset. In some constructions, there are two weight sensors 36 for each seat 12. In some other constructions, there are four weight sensors 36 for each seat 12.

Figure 3:
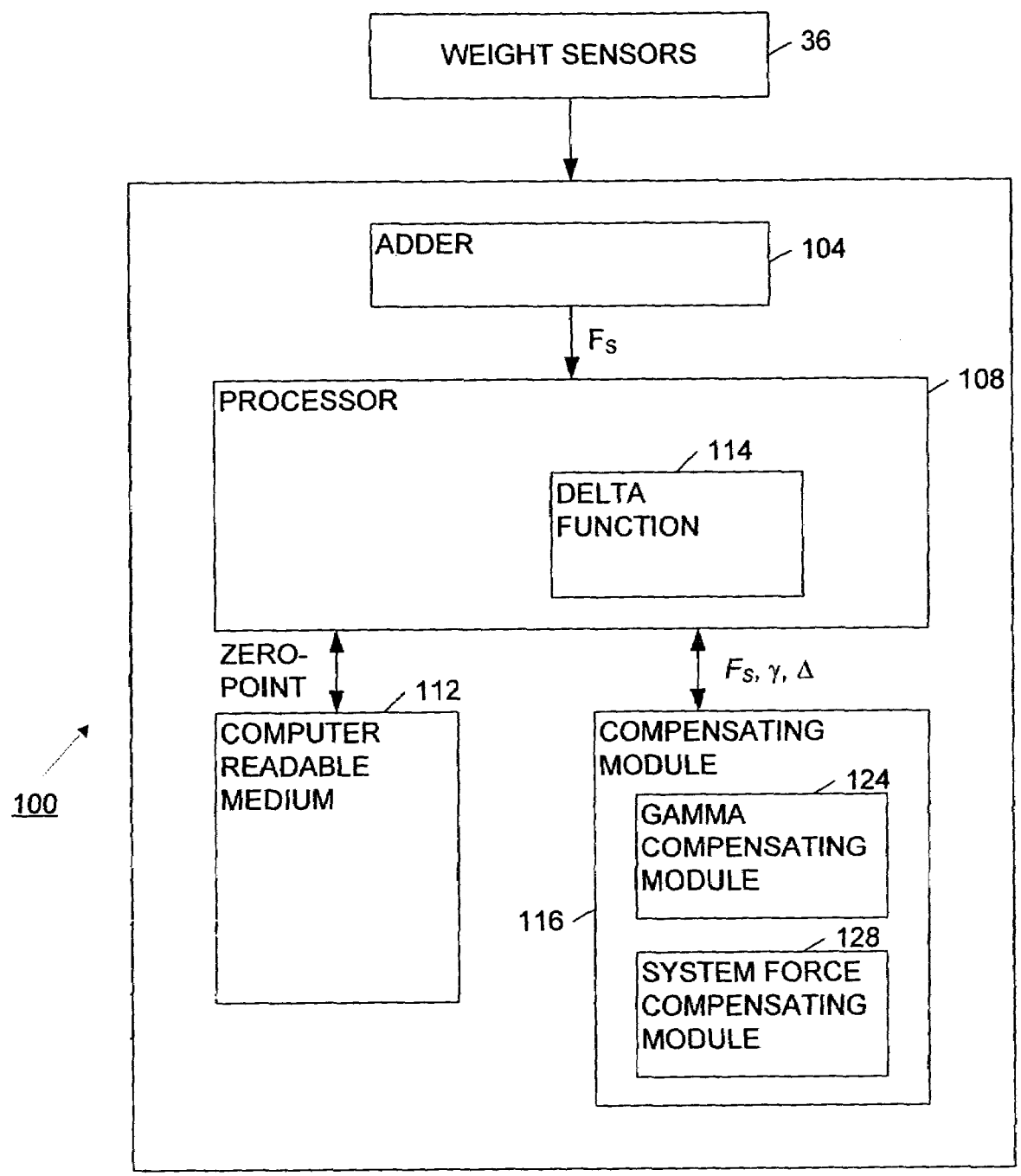
FIG. 3 is a block diagram of an exemplary long-term correction system.

FIG. 3 shows a block diagram of an exemplary long-term correction system 100. In some embodiments, the long-term correction system 100 receives its input from sensors such as the weight sensor 36. Furthermore, the long-term correction system 100 can be a general-purpose micro-controller, a general-purpose microprocessor, a dedicated microprocessor or controller, a signal processor, an application-specific-integrated circuit ("ASIC"), or the like. In some embodiments, the system 100 and its functions or modules described are implemented in a combination of firmware, software, hardware, and the like. To be more specific, as illustrated in FIG. 3, a processor 108 communicates with other modules (discussed below) that are depicted as if these modules were implemented in hardware. However, the functionality of these modules could be implemented in software, and that software could, for example, be stored in a computer-readable medium 112 and executed by the processor 108. In addition, the computer-readable medium 112 can also be a memory embedded in the processor 108.

The values obtained by the weight sensors 36 are fed to an adder 104 that sums the values, which results in a system force or a sum of forces Fs. In some constructions, there are four weight sensors 36 for each seat 12. In such cases, four forces are detected by the weight sensors 36 and are summed in the adder 104. The system force Fs is then fed to the processor 108. In some other constructions, there are more or less weight sensors. The system 100 also retrieves a reference point or zero-point γ of the seat 12 from a computer-readable medium 112. The zero-point γ generally indicates when the seat is presumed to be empty.

The processor 108 also includes a delta function module 114. The delta function module 114 can be a look-up table stored in a second computer-readable medium, or a mathematical formulation that determines or defines a rate of zero-point changes as a result of the system force Fs. In some constructions, the mathematical formulation described is implemented in a combination of firmware, software, hardware, and the like. The delta function module 114 can include a delta function that is a curve or a formula that controls the behavior of zero-point changes. The delta function used in any single implementation can be based on the application in which the system 100 will be used and customer requirements. The delta function is generally a non-negative function, and can have a plurality of shapes such as a rectangular pulse, and a normal curve, detailed hereinafter. The processor 108 determines a delta or zero-point change from the delta function in the delta function module 114. The zero-point change generally provides an amount of the zero-point γ that requires adjustment based on the system force Fs when the zero-point is to be adjusted or updated.

The system force Fs, the initial zero-point γ, and the zero-point change (Δ) obtained are fed to a compensating module 116 that compensates for the offset generated. The compensating module 116 includes a gamma compensating module 124 that updates the zero-point γ based on the zero-point change and the system force Fs. The compensating module 116 also includes a system force-compensating module 128 that updates the system force Fs due to the offset and the updated zero-point γ.

Figure 4:
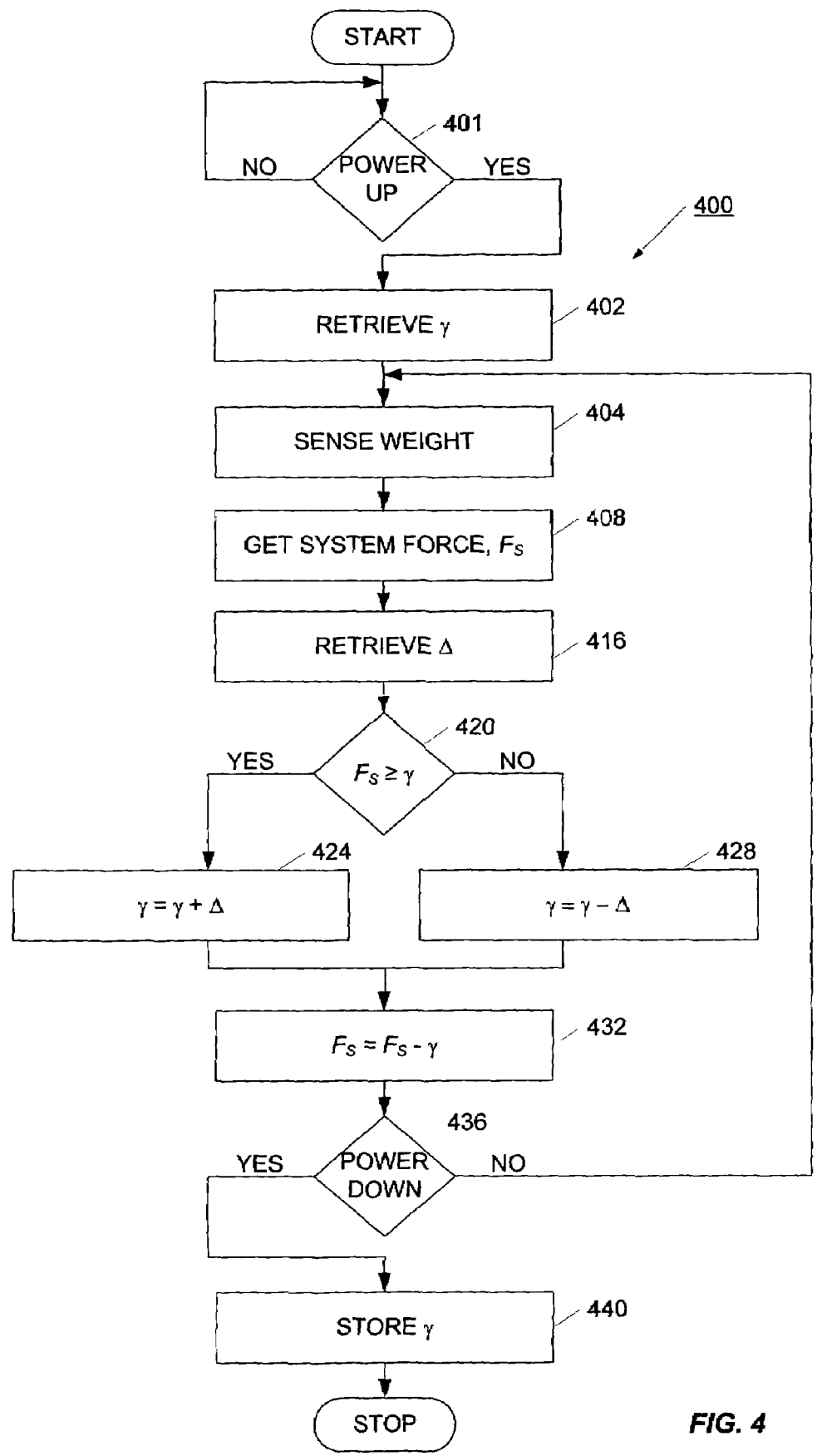
FIG. 4 is a flow chart illustrating an exemplary offset compensating process.

FIG. 4 provides a flow chart that further illustrates an offset compensating process 400 that occurs in some constructions, including processes that may be carried out by software, firmware, or hardware. When the system 100 is powered up (block 401), the zero-point γ stored in the computer-readable medium 112 is retrieved at block 402 for processing. Initially, the zero-point γ at seat installation is zero. However, the zero-point γ can assume different values over time due to causes such as aging. For example, a zero-point γ such as 1 lb., and 2 lbs. might be assumed. In many instances, the zero-point γ is a relatively small value in comparison to the weight of a human adult.

As noted, the sensors 36 sense the weight of the occupant. This is shown at block 404. The data generated by the weight sensors 36 is then summed (block 408) to obtain the system force Fs. The delta function module 114 then uses the system force Fs to obtain the zero-point change at block 416, detailed hereinafter. Once the system 100 has retrieved or determined the zero-point change, the system 100 updates both the zero-point γ and the system force Fs using the gamma compensating module 124 (of FIG. 3) and the system force compensating module 128 (of FIG. 3), respectively.

Specifically, the system 100 first compares the zero-point γ with the system force Fs at block 420. If the system force Fs is at least equal to the zero-point γ, the zero-point γ is updated by summing the zero-point change and the zero-point γ at block 424. Otherwise, if the system force Fs is less than the zero-point γ, the zero-point γ is updated by subtracting the zero-point change from the zero-point γ at block 428. Thereafter, the system force Fs is updated at block 432 by subtracting the updated γ from the system force Fs and is made available for output to other systems of the vehicle. If the system 100 has not been powered down as determined at block 436, the system 100 repeats the compensating process 400 starting at block 404 such that the system force Fs can be constantly updated. In some constructions, the rate at which the system force Fs is updated is 1 Hz. The updated gamma is stored in the computer-readable medium 112 after power down (block 440).

Figure 5A:
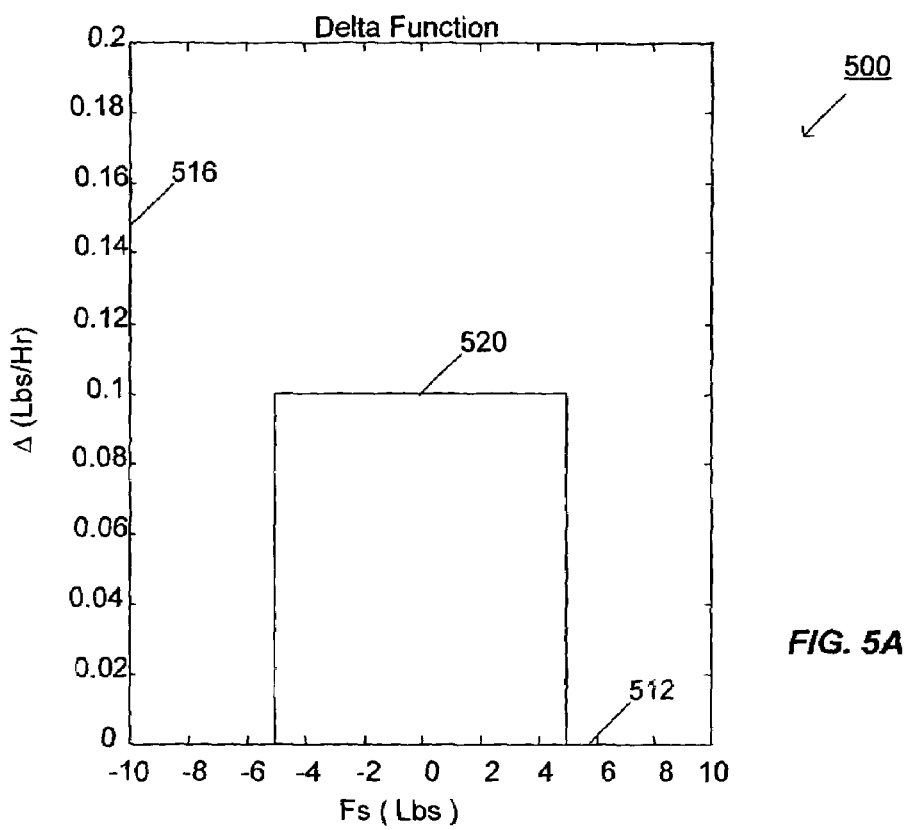
FIG. 5A is a graph of a first exemplary delta function.
Figure 5B:
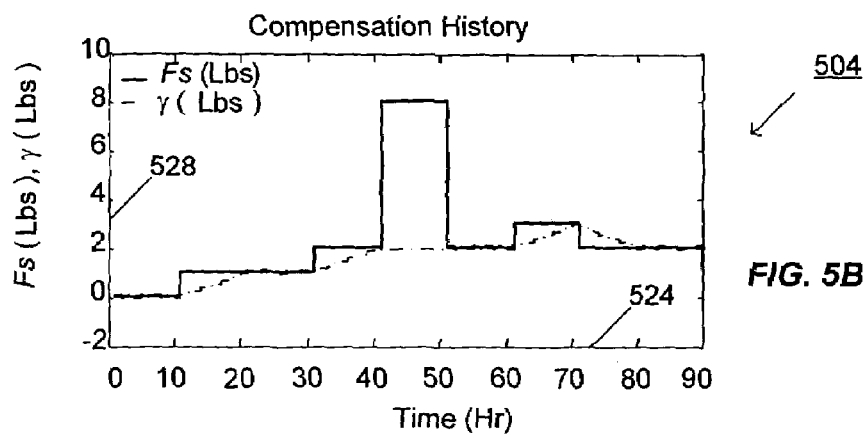
FIG. 5B is a first exemplary compensation history.
Figure 5C:
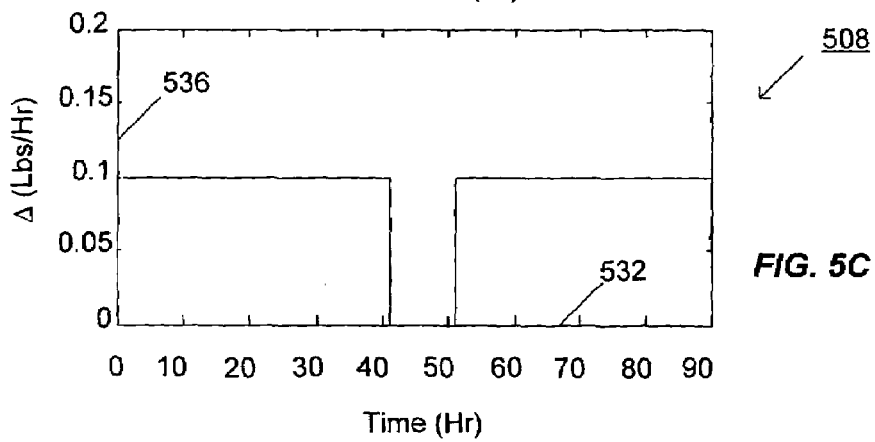
FIG. 5C is a first exemplary graph of a rate of zero-point changes.

FIG. 5A shows a graph 500 of a first exemplary delta function 520, FIG. 5B shows a first exemplary compensation history 504, and FIG. 5C shows a graph 508 of a first exemplary rate of zero-point changes over time. Particularly, as shown in FIG. 5A, the system force Fs values (measured in pounds) are measured along an x-axis 512, and the corresponding zero-point change or Δ values (measured in pounds per hour) are measured along a y-axis 516. The delta function 520 show a Δ value of 0.1 lbs. per hour from −5 pounds ("lbs.") to +5 lbs., and a Δ value of 0 for weights lower than −5 lbs., and above +5 lbs. Other weight cutoffs and other Δ values can also be used. The Δ values used may be modified for the type of occupant expected to use the seat 12, the type of vehicle in which the system 100 will be used, and other factors.

As shown in FIG. 5B, times at which the system force Fs are measured along an x-axis 524 (measured in hours), and the values of the system force Fs before being compensated (measured in pounds), and of the zero-points γ (measured in pounds) are measured along a y-axis 528. As the system force Fs remains approximately zero lbs., the zero-points γ hovers or oscillates around zero between hour 0 and hour 10 assuming that the zero-point γ has an initial value of zero. Particularly, FIG. 5B shows that as the system force Fs starts with a value of zero, the zero-point change Δ retrieved is 0.1 lbs. Since the system force Fs is equal to the zero-point γ retrieved (as determined in block 420 of FIG. 4), the zero-point change Δ retrieved is 0.1 lbs. and is added to the zero-point γ to result in an updated zero-point value of 0.1 (see block 424 of FIG. 4) at a first updating time, hour 1. Subsequently, the system force Fs is then compensated to result in −0.1 lbs. at hour 1 (see block 432 of FIG. 4).

At a second updating time, the weight is sensed again (at block 404 of FIG. 4), a new system force Fs is determined (at block 408 of FIG. 4), and a zero-point change Δ of 0.1 Lbs/Hr is retrieved based on the new system force Fs (at block 416 of FIG. 4). Thereafter, the system 100 determines that the weight sensed at hour 2 is less than the previously updated zero-point γ value of 0.1 (see block 420 of FIG. 4). The zero-point change Δ of 0.1 lbs/hr is thus subtracted from the zero-point γ of 0.1 (see block 428 of FIG. 4) to result in an updated zero-point of 0 at hour 2. The system force Fs is also subsequently updated to reflect changes occurred in the zero-point. That is, the system 100 subtracts a γ value of zero from the system force Fs value of 0 during the second updating time to result in zero lbs. (see block 432 of FIG. 4). The compensating process 400 repeats for the next several hours.

However, as the system force Fs increases to 1 lb. at hour 11, the zero-point γ is ramped up. For example, since the system force Fs value of 1 lb. is greater than the zero-point γ value of 0 (see block 420 of FIG. 4), the zero-point change Δ of 0.1 lbs/hr is added to the zero-point γ value of 0 to result in an updated zero-point γ value of 0.1, at hour 11 (see block 424 of FIG. 4). The zero-point γ value continues to ramp up until the load remains in the seat 12 for more than 10 hours. Particularly, after approximately 10 hours, the zero-point γ hovers around 1 lb. for 10 hours between hours 20 and 30. If an additional load is placed on the seat, for example, a one-pound book, then additional compensation should occur. This circumstance is shown in FIG. 5B and occurs at hour 30. As a result, the total weight is 2 pounds, and the zero-point γ rises to 2 lbs. after hour 40. After hour 40, a total weight of 8 lbs. is applied to the seat 12. However, since the zero-point change Δ at 8 lbs. in FIG. 5A has a value of zero, the system force Fs and γ remain at 2 lbs., respectively, until approximately hour 60. After hour 60, a total weight of 3 lbs. is applied to the seat for less than 10 hours. As a result, while the zero-point γ ramps up to about 3 pounds, the zero-point γ also decreases after hour 70 when the total weight decreases back to 2 lbs.

As shown in FIG. 5C, the times at which the system force Fs are updated are measured along an x-axis 532 (in hours), and the values of the corresponding rate of zero-point changes are measured along a y-axis 536. The rate of zero-point changes from hour 0 to approximately hour 40 is 0.1 according to the delta function 500 in FIG. 5A, since the total weight is between −5 lbs. and +5 lbs. Between about hour 40 and about hour 50, since the total weight is more than 5 lbs., the rate of zero-point changes has a value of zero since the delta function at more than 5 lbs. has a value of zero.

Figure 6A:
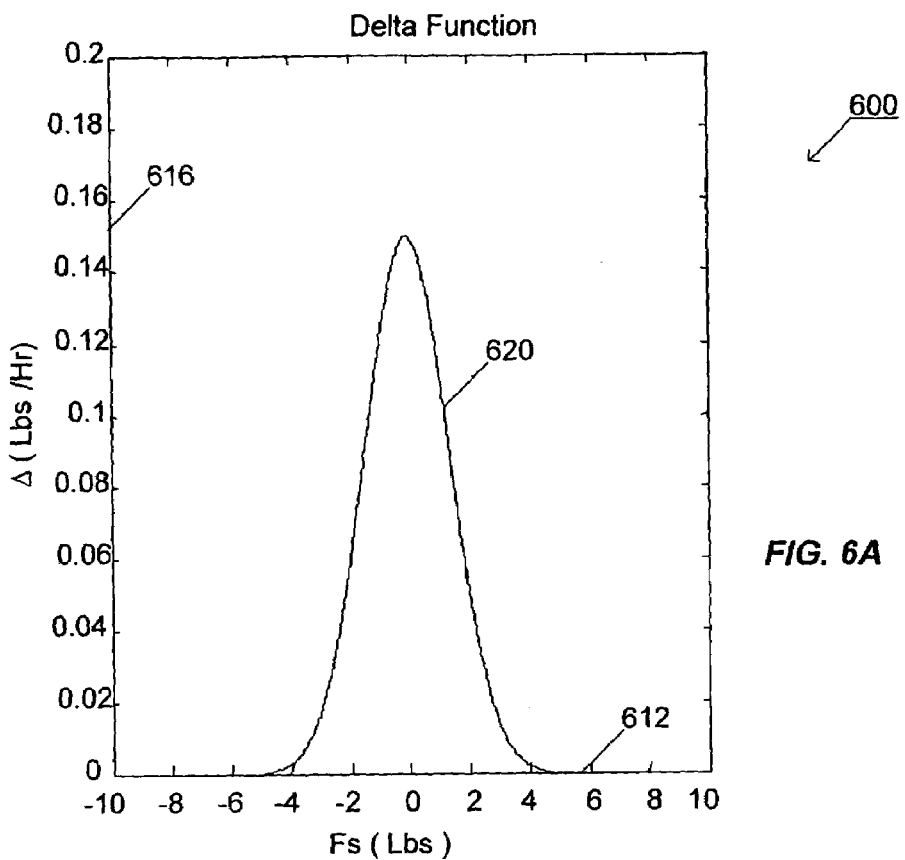
FIG. 6A is a graph of a second exemplary delta function.
Figure 6B:
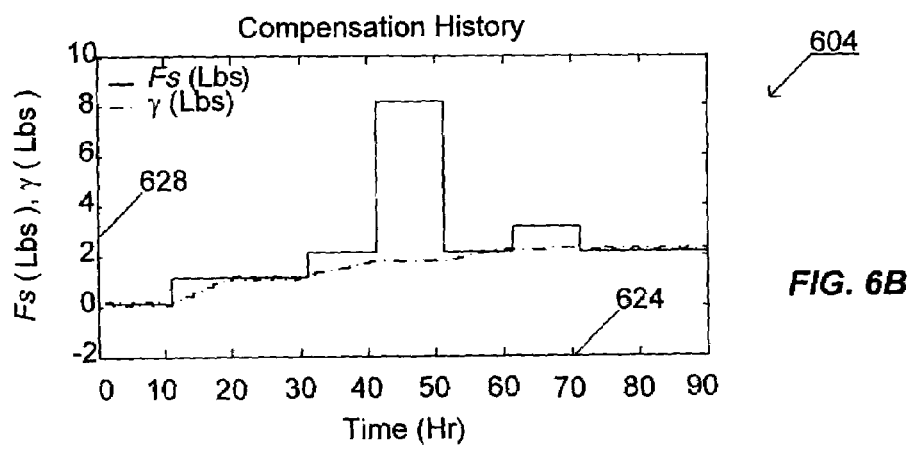
FIG. 6B is a second exemplary compensation history.
Figure 6C:
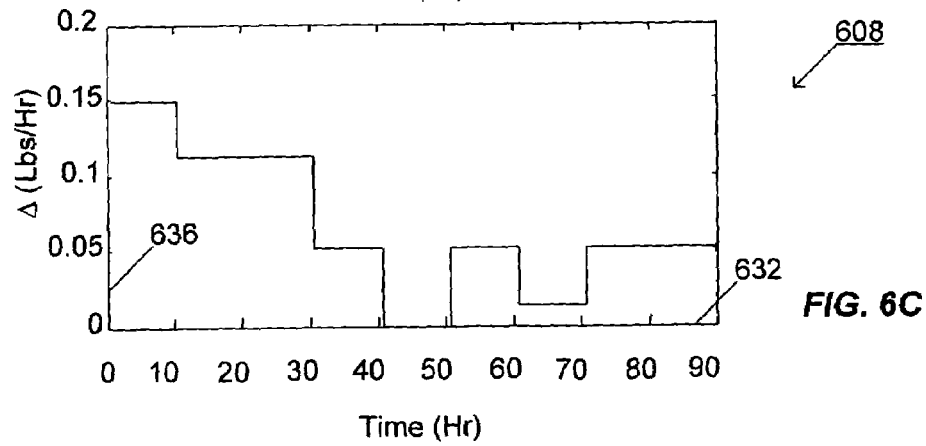
FIG. 6C is a second exemplary graph of a rate of zero-point changes.

The delta function of FIG. 5A is just one example. FIG. 6A shows a graph 600 of a second exemplary delta function 620. FIG. 6B shows a second exemplary compensation history 604. FIG. 6C shows a graph 608 of a second exemplary rate of zero-point changes over time. As shown in FIG. 6A, the system force Fs values (in pounds) are measured along an x-axis 612, and the corresponding rate of zero-point changes values (in pounds per hour) are measured along a y-axis 616. The graph 600 shows a normal delta function 620 with a rate of zero-point changes of about 0 for weights lower than −8 lbs., and above +8 lbs. For loads between −8 lbs. and +8 lbs., the delta function generally follows a normal curve, which has its maximum value at 0 lbs. Further away from the maximum of the normal delta function 620, the rate of zero-point changes assumes smaller values. In this way, if the system force Fs is close to 0 lbs., the seat 12 is very likely empty. Similarly, when the system force Fs is closer to 5 lbs., the system will take relatively longer to recognize the load.

As shown in FIG. 6B, the updating times at which the system force Fs are measured along an x-axis 624 (in hours), and the values of the system force Fs before being compensated (in pounds), and of the zero-points (in pounds) are measured along a y-axis 628. As shown in FIG. 6C, the times at which the system force Fs are updated are measured along an x-axis 632 (in hours), and the corresponding rate of zero-point changes Δ values are measured along a y-axis 636.

The compensating process 400 can also be applied to other types of measurements. For instance, the compensating process can also be applied to a speedometer on a vehicle. The compensating process can also be applied to any signal that expects to be at zero at some point.

Thus, the invention provides, among other things, a method of measurement. Various features and aspects of embodiments of the invention are set forth in the following claims.

What is claimed is:

1. A method of compensating a measurement and controlling a device, the method comprising:
   determining a zero-point of a sensing system;
   determining a measurement by subtracting the zero-point from a sensed weight;
   determining a rate of change of the zero-point from a delta function, wherein the delta function defines the rate of change of the zero-point as a function of the difference between the sensed weight and the zero-point;
   updating the measurement at regular intervals based on the zero-point and the rate of change of the zero-point; and
   using the updated measurement to control a device.

2. The method of claim 1, wherein the zero-point comprises a first zero-point, and wherein updating the measurement includes:
   determining a zero-point change from the rate of the change of the zero-point;
   determining an updated zero-point from the first zero-point and the zero-point change; and
   adjusting the measurement with the updated zero-point.

3. The method of claim 2, further comprising replacing the first zero-point with the updated zero-point.

4. The method of claim 2, wherein the delta function defines a magnitude of the zero-point change as inversely related to the difference between the sensed weight and the zero-point.

5. The method of claim 2, wherein the delta function defines a magnitude of the zero-point change as a first value when the difference between the sensed weight and the zero-point is within a first range, and defines the magnitude of the zero-point change as a second value when the difference between the sensed weight and the zero-point is outside of the first range.

6. The method of claim 5, wherein the second value equals zero.

7. The method of claim 1, wherein determining the zero-point comprises retrieving the zero-point from a computer-readable medium.

8. The method of claim 1, further comprising sensing phenomena.

9. The method of claim 1, wherein determining a rate of change of the zero-point from a delta function includes retrieving the delta function from a computer-readable medium.

10. A method of compensating for a load applied to a seat and controlling a safety device, the method comprising:
    retrieving a zero-point of the seat from a computer readable memory;
    determining a weight of the load by subtracting the zero-point from a total sensed weight, wherein the total sensed weight is the weight of the seat when empty plus the weight of the load applied to the seat;
    determining a rate of zero-point change from a delta function, wherein the delta function defines the rate of zero-point change as a function of a difference between the total sensed weight and the zero-point;
    updating the zero-point of the seat at regular intervals based on the zero-point and the rate of the zero-point change;
    updating the weight of the load based on the updated zero-point; and
    using the updated weight of the load to control the safety device.

11. The method of claim 10, wherein updating the zero-point comprises:
    determining a zero-point change from the rate of zero-point change;
    comparing the total sensed weight with the zero point; and
    adjusting the zero-point with the zero-point change if the total sensed weight differs from the zero-point.

12. The method of claim 10, wherein the zero-point comprises a first zero-point, the method further comprising replacing the first zero-point with the updated zero-point.

13. The method of claim 10, further comprising updating the zero-point of the seat at regular intervals based on the zero-point and the rate of the zero-point change when the seat is occupied and when the seat is unoccupied.

14. A system for compensating for a load applied to a seat, the system comprising:
    a computer-readable medium configured to store a zero-point of the seat;
    a sensor configured to sense a total weight, wherein the total weight is the weight of the seat when empty and the load applied to the seat;
    a processor comprising a delta function module, wherein the delta function module is configured to determine a zero-point change at regular intervals as a function of the difference between the total weight and the zero-point; and
    a compensating module configured to determine a weight of the load by compensating the total weight based on the zero-point and the zero-point change.

15. The system of claim 14, wherein the compensating module further comprises a first module configured to receive the zero-point change, and to update the zero-point with the zero-point change.

16. The system of claim 14, wherein the compensating module further comprises a second module configured to subtract the zero-point from the total weight.

17. The system of claim 14, wherein the processor is further configured to compare the total weight with the zero-point, and to adjust the zero-point when the total weight differs from the zero-point.

18. The system of claim 14, wherein the delta function module is further configured to determine a zero-point change that is inversely related to the difference between the total weight and the zero-point.

19. The system of claim 14, wherein the delta function module is further configured to set the zero-point change to equal a first value when the difference between the sensed weight and the zero-point is within a first range, and set the zero-point change to equal zero a second value when the difference between the sensed weight and the zero-point is outside of the first range.

20. The system of claim 19, wherein the second value equals zero.

21. The system of claim 14, wherein the processor is further configured to run the delta function module and the compensating module when the seat is occupied and when the seat is unoccupied.

22. A method of controlling a restraint device in a vehicle having a seat, the method comprising:
    determining a weight applied to the seat of the vehicle by sensing a total weight and subtracting a zero-point from the total weight, wherein the total weight is the weight of the seat when empty plus the weight of the load applied to the seat;
    using a delta function to determine a rate of zero-point change as a function of the difference between the total weight and the zero-point;
    adjusting the zero-point at regular intervals based on the rate of zero-point change;
    compensating the total weight with the undated zero-point; and
    activating the restraint device after the total weight has been compensated.

23. The method of claim 22, wherein adjusting the zero-point comprises:
    retrieving a zero-point;
    determining an intermediate zero-point from the rate of zero-point change and the total weight;
    comparing the total weight with the intermediate zero-point; and
    updating the zero-point with the intermediate zero-point when the intermediate zero-point differs from the total weight.

24. The method of claim 22, wherein compensating the total weight comprises subtracting the zero-point from the total weight.

25. The method of claim 22, further comprising storing the updated zero-point.

26. A method of controlling a vehicle, the method comprising:
- sensing a value of at least one phenomenon experienced by the vehicle;
- using a delta function to determine a rate of zero-point change as a function of the difference between a zero-point and the sensed value;
- repeatedly and automatically adjusting the zero-point based on the rate of zero-point change;
- compensating the sensed value with the zero-point;
- outputting the compensated sensed value; and
- controlling the vehicle using the compensated value.

27. The method of claim 26, wherein adjusting a zero-point comprises:
- retrieving a zero-point;
- determining an intermediate zero-point from the rate of zero-point change and the sensed value;
- comparing the sensed value with the intermediate zero-point; and
- updating the zero-point with the intermediate zero-point when the intermediate zero-point differs from the sensed value.

28. The method of claim 26, wherein compensating the sensed value comprises subtracting the zero-point from the sensed value.

29. The method of claim 26, further comprising storing the adjusted zero-point.

30. A compensating system for use with a sensor adapted to sense a value of at least one phenomenon, the system comprising:
- a computer-readable medium configured to store a zero-point of the sensor;
- a processor comprising a delta function module, wherein the delta function module is configured to repeatedly and automatically determine a zero-point change as a function of the difference between the zero-point and the sensed value; and
- a module configured to adjust the sensed value based on the zero-point and the zero-point change.

31. The system of claim 30, wherein the module further comprises a first module configured to receive the zero-point change, and to update the zero-point with the zero-point change.

32. The system of claim 30, wherein the module further comprises a second module configured to subtract the zero-point from the sensed value.

33. The system of claim 30, wherein the processor is further configured to compare the sensed value to the zero-point, and to adjust the zero-point when the sensed value differs from the zero-point.

34. The system of claim 30, further comprising a sensor adapted to sense the value.

* * * * *